United States Patent [19]

Reinhardt

[11] Patent Number: 5,680,609
[45] Date of Patent: Oct. 21, 1997

[54] METHOD AND APPARATUS FOR SYNCHRONIZING FILE DELETIONS IN COMPUTER SYSTEMS

[75] Inventor: Dennis Reinhardt, Palo Alto, Calif.

[73] Assignee: Intel Corporation, Santa Clara, Calif.

[21] Appl. No.: 259,920

[22] Filed: Jun. 10, 1994

[51] Int. Cl.⁶ .................................................. G06F 17/30
[52] U.S. Cl. ............................................................ 395/610
[58] Field of Search ...................................... 395/600, 610

[56] References Cited

U.S. PATENT DOCUMENTS

| | | | |
|---|---|---|---|
| 4,825,354 | 4/1989 | Agrawal et al. | 395/600 |
| 5,220,657 | 6/1993 | Bly et al. | 395/425 |
| 5,313,646 | 5/1994 | Hendricks et al. | 395/600 |
| 5,335,346 | 8/1994 | Fabbio | 395/610 |
| 5,367,698 | 11/1994 | Webber et al. | 395/800 |
| 5,418,957 | 5/1995 | Narayan | 395/700 |
| 5,421,012 | 5/1995 | Khoyi et al. | 395/650 |
| 5,469,576 | 11/1995 | Dauerer et al. | 395/186 |
| 5,495,521 | 2/1996 | Rangachar | 379/95 |
| 5,584,022 | 12/1996 | Kikuchi et al. | 395/609 |

OTHER PUBLICATIONS

Using Norton Desktop for Windows, Symantec Corporation, cr. 1991, pp. {4–8 to 4–9; 12–5 to 12–12} Dec. 1991.

*Primary Examiner*—Wayne Amsbury
*Attorney, Agent, or Firm*—Blakely, Sokoloff, Taylor & Zafman

[57] ABSTRACT

A method and apparatus for synchronizing the deleting of files across similarly configured file-systems is described. The present invention is used in computer systems which have similarly configured file-systems and as such have similar files existing in the file-systems. The present invention includes a method of identifying files deleted in an originating computer or file-system and automatically propagating the deleted file entries to a receiving file-system where they are deleted.

19 Claims, 7 Drawing Sheets

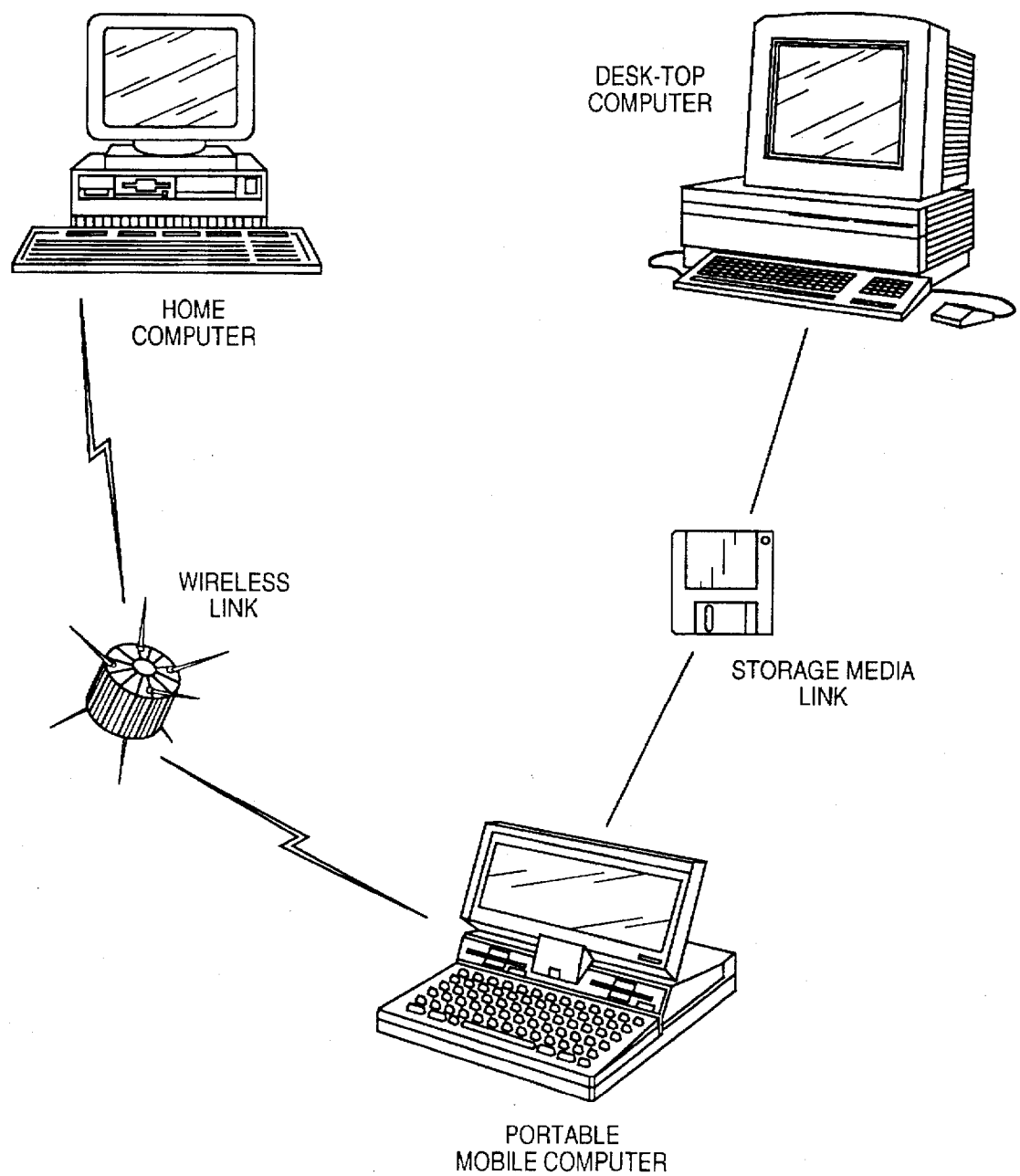
FIG_1

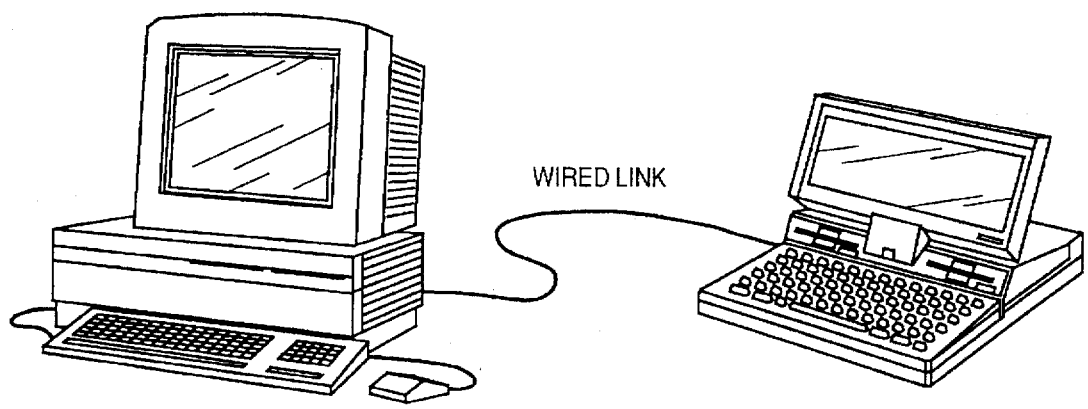
FIG_2

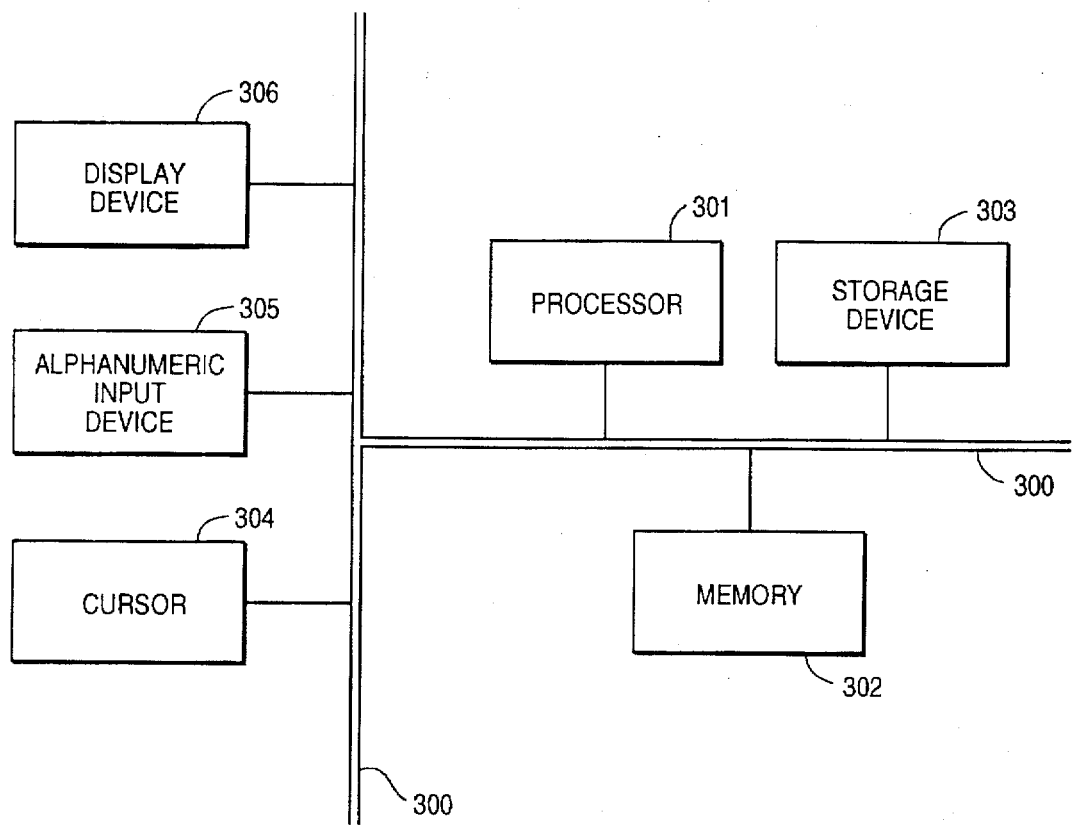
FIG_3

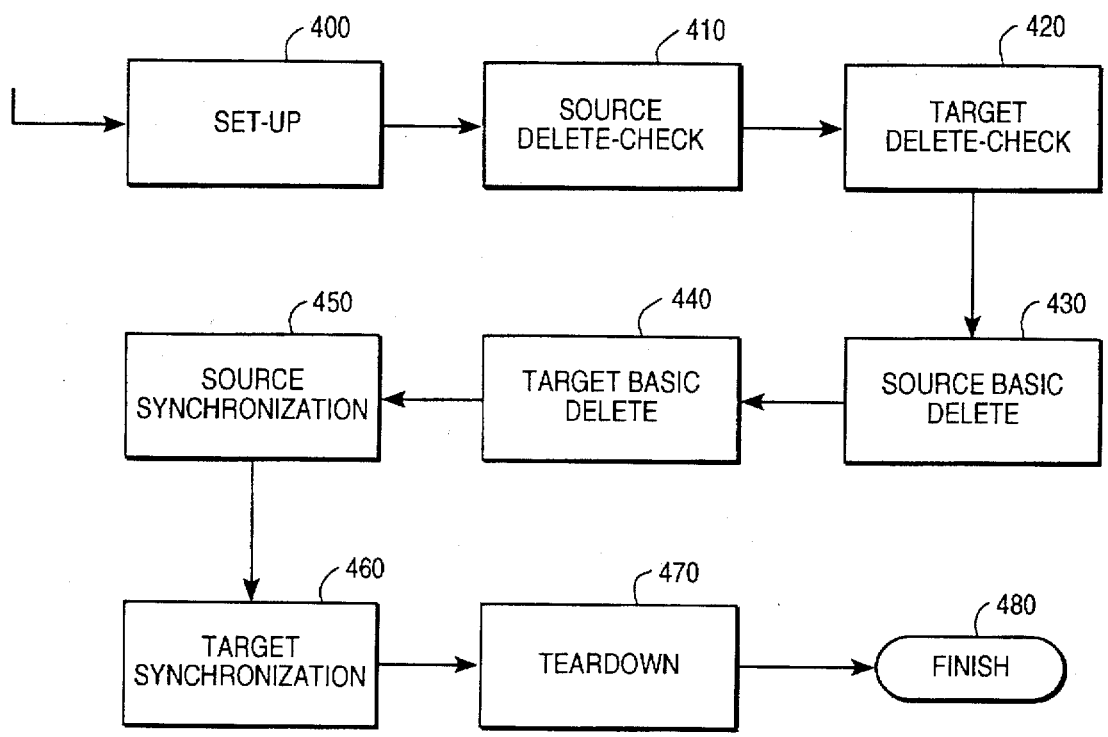
FIG_4

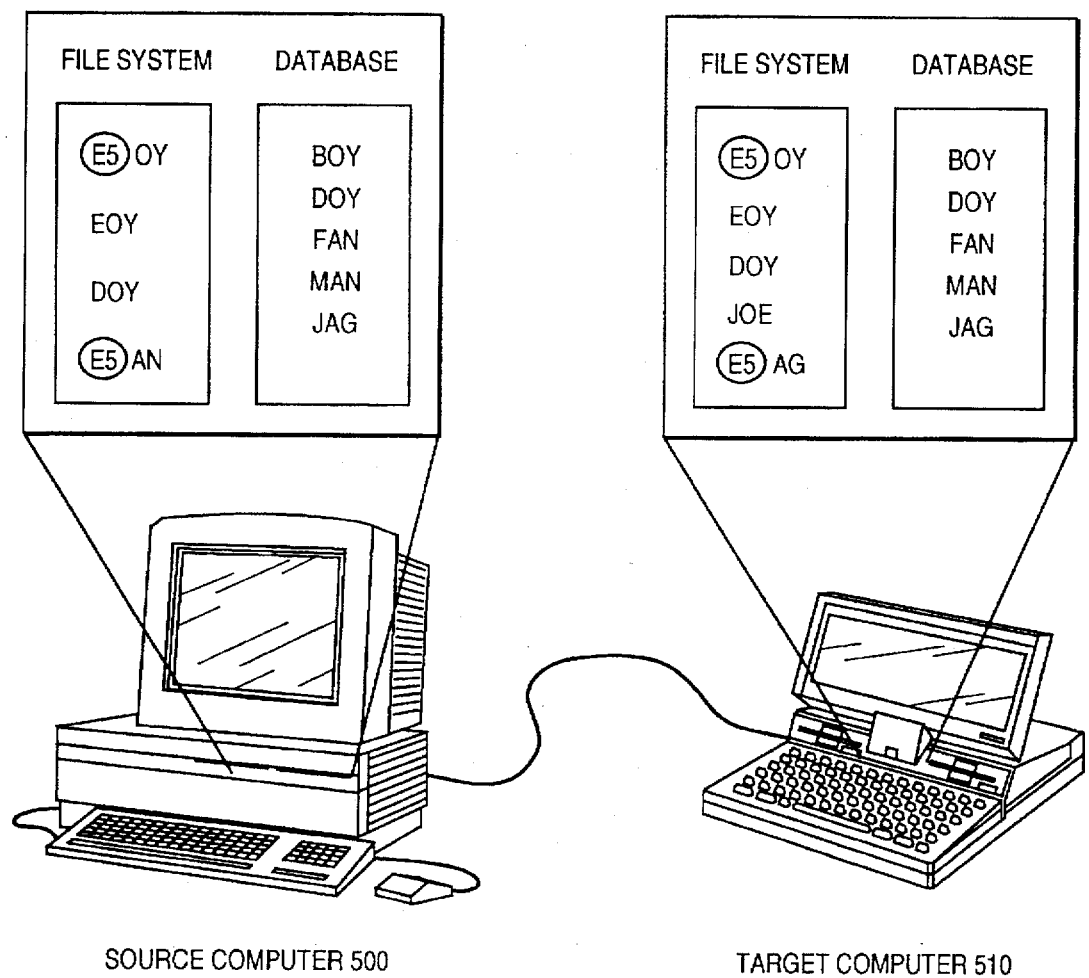
FIG_5

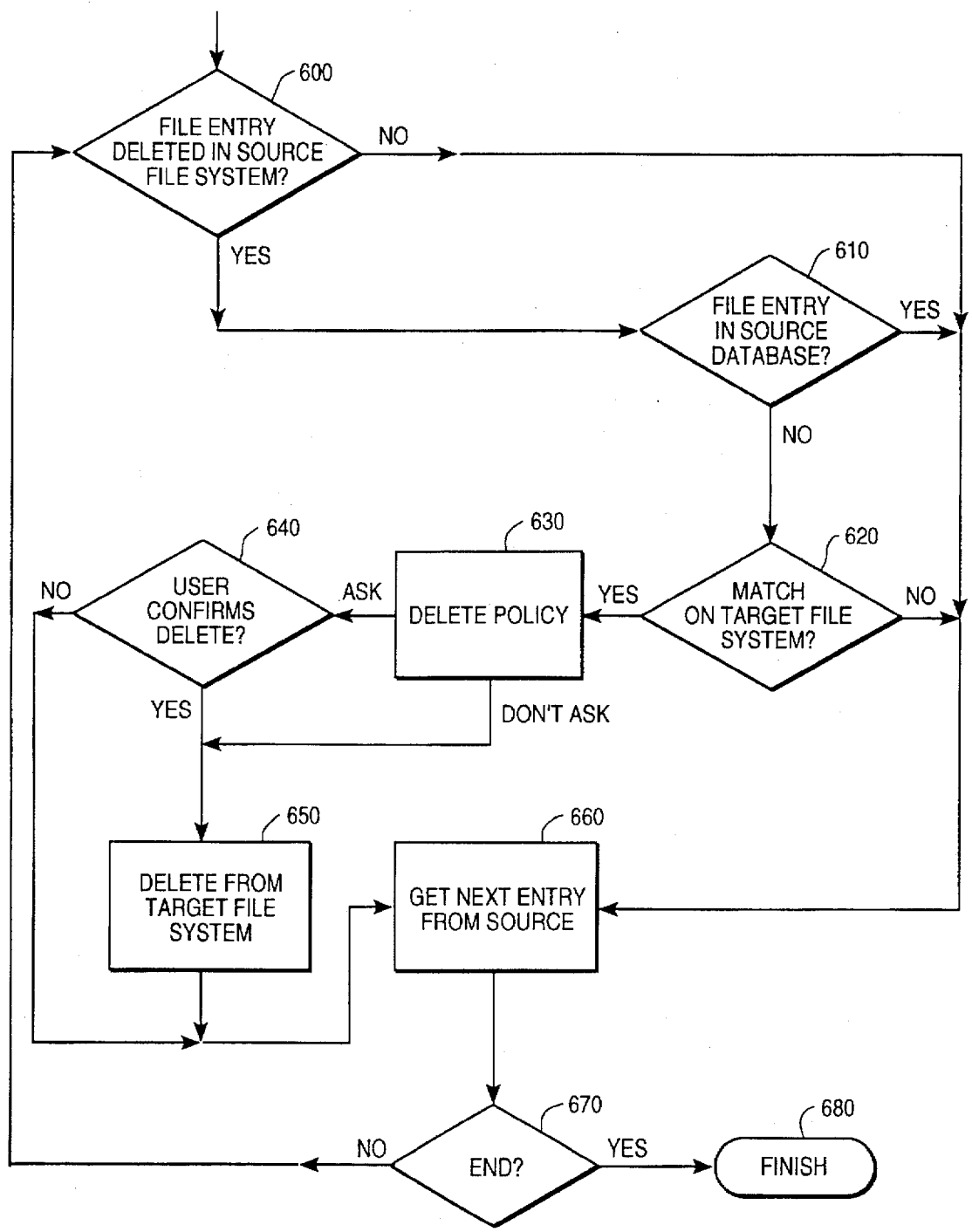
FIG_6

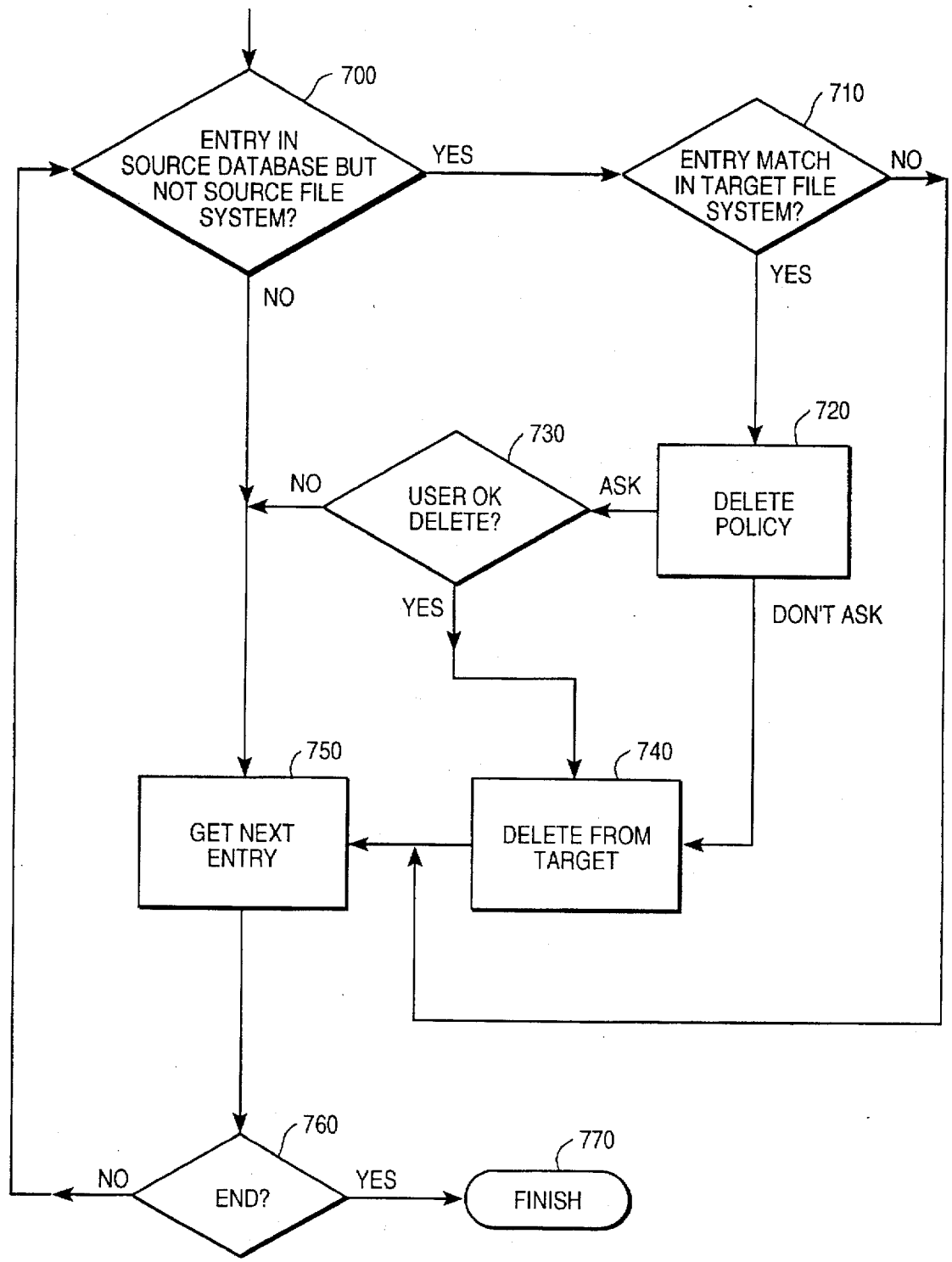
FIG_7

METHOD AND APPARATUS FOR SYNCHRONIZING FILE DELETIONS IN COMPUTER SYSTEMS

BACKGROUND OF THE INVENTION

1. Field of the Invention

The present invention relates to computer systems. More specifically, the present invention relates to features that enable file deletions to be propagated from one computer file-system to another similarly configured computer file-system.

2. Description of Related Art

The proliferation of personal computers has led to an increased use of computers in business and other facets of our lives. The introduction of mobile computing has made this use even more pronounced, as computer users can now use their computers practically anywhere. Mobile computing also enables computer users to have a portable computer, such as a notebook or sub-notebook computer they carry around, while also using a desk-top computer in the office or at home.

The flexibility of using both a mobile and a desktop computer allows the user continuity in working on the same files across the two different computer platforms (e.g., mobile and desktop), by simply transferring files from one computer to the other. FIG. 1 is an illustration of a computer system configuration comprising, from left to right, a high powered office workstation, a portable notebook computer, and a desk-top home-computer.

In the computer system configuration in FIG. 1, the file system, which comprises the logical or physical setup of files in each computer is similarly configured even though each file-system may have different components (e.g., different disk sizes). The file-system in the two computers are similarly configured to allow the user the flexibility of transferring files from one system to another. The ability to transfer files allows the computer user the convenience of working on the same files either in the office, at home, or anywhere outside these two locations.

As the user continues to work on the same files in either one of the computer platforms, the user is confronted with the problem of making sure that the file characteristics, such as file contents, are the same across the file-systems at any particular point in time. The user is also faced with the problem of ensuring that when files are modified either through file deletions or additions in one file-system, the modification is duplicated in the other so as to maintain continuity in the user's work.

To ensure that files in the file-systems in the two computers are the same, prior art synchronization methods which involve updating and addition of files in similarly configured file-systems have been used. FIG. 2 shows two computers, with similarly configured file-systems, connected via an electronic link. Using one prior art synchronization method, file synchronization is achieved across the electronic link between the two computers when the computer user initiates file transfer from one computer to the other.

The file synchronization method of the prior art only allows the computer user to automatically add files from one file-system to the other file-system after the two computers have been linked together. The file synchronization method may include piecemeal copying of files by the computer user from an originating file-system to a receiving file-system. Alternatively, the computer user may initiate file synchronization by copying the entire contents of the originating file-system over to the receiving file-system thus overwriting the contents of the receiving file-system.

Although the file synchronization method of the prior art allows the computer user to automatically add files across file systems either through mass or piecemeal copying, the prior art synchronization method does not allow the user to automatically synchronize file deletions across multiple file systems. To synchronize file deletions across file systems, the computer user has to manually scan the contents of the originating file-system to identify files that have been deleted. The file identification step requires the user to remember the previous contents of the file-system prior to any file deletions. The user then purges the contents of the receiving file-system to identify files that exist in the receiving file-system that do not exist in the originating files-system. Any files so identified are assumed deleted from the originating file-system and are therefore deleted from the receiving file-system. The dangers of performing such a file deletion synchronization method is that the user might delete files from the receiving file-system that may have just been created which needed to be copied to the originating file-system. Thus, such a file identification process may result in inconsistent files being identified. Also, this prior art file deletion method can be painstakingly time consuming when a large number of files has to be deleted. To delete files, the computer user not only has to ensure that the right files are identified to be deleted from the receiving file-system, but the computer user also has to remember files existing in the file-systems prior to any file deletions.

The amount of time involved in synchronizing file deletions across file-systems in the prior art deters some computer users from pursuing such a file deletion method and leads to some computer users completely abandoning file synchronization entirely. Thus, an effective method of automatically synchronizing file deletions across similarly configured file-systems is needed.

SUMMARY OF THE INVENTION

The present invention provides a method and apparatus for synchronizing file deletions across similarly configured computer file-systems. In the described embodiment, two computers each having a similarly configured file-system are electronically linked together so that file deletions originating from a source computer are propagated across the link to a receiving target computer.

During file deletions in the source computer, files deleted from the source file-system are identified in the source computer's operating system directory. The deleted file entries identified in the source file-system are propagated across the electronic link to the target computer. When the target computer receives the deleted file entries propagated from the source computer, the files in the target file-system are compared with the deleted file entries from the source computer. The file entries that match deleted file entries propagated from the source computer are identified as files to be deleted from the target files-system and the files so identified are deleted.

The described embodiment also includes the creation of a database of file entries existing in each file-system in the source computer and the target computer. The file-entry database is created by copying file name of files existing in the file-systems at a time prior to any file deletions. The database contents are updated whenever files are synchronized as described in FIG. 4.

The described embodiment uses the database as a complementary or an alternative means to the operating system identification method, to identify files deleted from the source file-system. The files deleted from the source file-system are identified by comparing the contents of files in the source file-system with file entries in the database. The files which exist in the database but not in the source file-system are deemed deleted from the source file-system. The files identified after the comparison of the source computer's database and the source file-system are propagated across the electronic link to the target file-system. The file entries propagated from the source computer are compared with files in the target file-system and if any of the files in the target file-system match any of the file entries, the files are deleted from the target file-system.

The described embodiment further includes a delete policy which enables the computer user to confirm files identified for deletion in the target computer before the files are deleted.

Advantages of the method of the present invention include a feature which enables the computer user to verify file deletion in the target computer before actual deletion. The file verification procedure of the present invention also allows files to be deleted in the receiving computer without any of the inconsistencies in file identification in the prior art. The file deletion method of the present invention can also be performed simultaneously where file deletion is reciprocated in the originating and receiving computers respectively. Such simultaneous implementation results in the present invention being less time consuming.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a block diagram that illustrates a prior art multi-computer system environment employing a home computer, a mobile portable computer, and an office desk-top computer.

FIG. 2 is a block diagram that illustrates a prior art file synchronization method between a portable mobile computer and a desk-top computer.

FIG. 3 is a block diagram that illustrates a computer system of the currently preferred embodiment of the present invention.

FIG. 4 is a block diagram that illustrates the flow of information in a file synchronization framework of a preferred embodiment of the present invention.

FIG. 5 is a block diagram of two computer systems electronically linked together with similarly configured file-systems.

FIG. 6 is a flow diagram that illustrates a file deletion pre-check phase of the currently preferred embodiment of the present invention.

FIG. 7 is a flow diagram that illustrates a file deletion phase of the currently preferred embodiment of the present invention.

DETAILED DESCRIPTION OF THE INVENTION

A method and apparatus for synchronizing file deletions across file systems on different computer systems is described. The method described herein is particularly useful in a portion of a computer program which is designed to be operating system independent (i.e., run in various computing platforms). The file-systems of the preferred embodiment may span physical as well as logical disks in a computer system. In the following description, numerous specific details such as the creation of files and directory structures are set forth in order to provide a thorough understanding of the present invention. However, it will be apparent to one skilled in the art that the present invention may be practiced without these specific details. In other instances, well known structures have not been shown in detail to avoid unnecessarily obscuring the present invention.

Overview of a Computer System of the Present Invention.

Referring now to FIG. 3, a block diagram of a computer system as may be utilized by the present invention is illustrated.

As illustrated in FIG. 3, a computer system, as may be utilized by the preferred embodiment of the present invention, generally comprises a bus 300 or other communications media for communicating information. The computer system includes a processor 301 coupled to the bus 300 for processing information, a memory subsystem 302 coupled to the bus 300 for storing information and instructions for the processor 301, and a data storage device 303, such as a disk drive, coupled to the bus 300 for storing information and instructions. A cursor control device 304 is also coupled to the bus 300 to control cursor movements in the computer system.

An alphanumeric input device 305 such as a keyboard is coupled to the bus 300 for communicating information and command selections to the processor 301. The computer system also includes a display device 306, such as a cathode ray tube or liquid crystal device, coupled to the bus 300 for displaying information to a computer user.

Certain implementations and uses of the computer system of the present invention may not require nor include all of the above components. For example, in certain implementations, the keyboard 305 and the cursor control device 304 for entering information to the system may not be required. In other implementations, it may not be required to provide the display device 306.

FIG. 4 is a block diagram illustrating the flow of information in a file synchronization framework of the currently preferred embodiment of the present invention. In the currently preferred embodiment, two similarly configured file-systems each residing in physically separated but electronically linked computer systems as described in FIG. 5 are used to describe the method of the present invention. The file-systems will be referred to as a source file-system and a target file-system respectively, with the source denoting the file-system where file deletion is originating and the target being the recipient of file deletion where subsequent deletion takes place. The set-up step 400, the source synchronization step 450, the target synchronization step 460, and the tear-down step 470 of FIG. 4 are well known file synchronization steps in the prior art and are therefore not described in detail in the present disclosure.

Referring to FIG. 4, the functions of the present invention begin when the computer system user performs a file set-up at is step 400 after the computer system has been powered up. The file-setup step 400 includes the gathering of user specifications, such as program dependent initializations and the sorting of files in the file-systems. The files from the file set-up step 400 are then presented to the other steps within the synchronization frame-work. When the user file set-up step 400 is completed, the files list is presented to step 410.

At the source delete-check step 410, which is described in more detail in FIG. 6, the source computer system uses its operating system file identification implementations to identify files deleted in the source fie-system. The source computer's operating system directory holds file information, such as files deleted from the source file-system, the contents and file characteristics in the source fie-system etc. The file entries of files identified as deleted from the source fie-system are propagated to the target computer. The propagated file entries from the source computer are subsequently deleted from the target file-system. Upon the completion of the source delete-check step 410 in the source computer, a delete check of the target fie-system is performed in the target computer at the target delete-check step 420.

At the target delete-check step 420, deleted files are identified in the target computer using the target system's operating system fie identification characteristics. The file entries of files deleted from the target fie-system are propagated to the source computer, where subsequent deletion of files corresponding to the propagated file entries from the target computer are deleted from the source file-system. After the target delete-check step 420 is completed, the synchronization method proceeds to step 430.

At the source basic delete step 430, which is described in more detail in FIG. 7, files deleted from the source file-system, unlike files in the source delete-check step 410 and the target delete-check step 420, are identified by comparing file entries in the source file-system with entries in a synchronized database in the source computer. Files identified as existing in the database in the source computer, but not in the source file-system are considered deleted from the source file-system. The files so identified are propagated to the target computer for subsequent comparison with file entries in the target file system. Any files identified in the target file-system which correspond to the propagated file entries from the source computer are deleted from the target file-system. Upon completion of the source basic delete step 430, the synchronization method proceeds to the target basic delete step 440.

At the target basic delete step 440, the target computer performs the basic delete method of the present invention. As stated above, the basic delete method of the present invention is described in detail in FIG. 6. Files are identified as deleted by comparing files in the target file-system with file entries in a database created in the target computer. The target database has file entries of files in the target file-system prior to any file deletions from the target file-system. The files identified as deleted from the target file-system are propagated to the source file-system where corresponding files are deleted. After files have been deleted from the source file-system, the source file-system is synchronized with respect to the target file-system at step 450.

At the source synchronization step 450, the source file-system is synchronized with respect to the target file-system by updating files in the source file-system that have corresponding files in the target file-system with any changes in the target file-system. The synchronization method also includes copying files created in the target file-system over to the source file-system. After the source file-system has been synchronized with respect to the target file-system, the target file-system is synchronized with respect to the source file-system at step 460.

At target synchronization step 460, the target file-system is synchronized with respect to the source file-system by updating files in the target file-system with any file changes that may have occurred in files in the source computer. After the target file-system has been synchronized, the files in the file-systems are deinitialize to end the synchronization process at step 470.

At the tear-down step 470, the computer system deinitializes files in the file-systems (e.g., source file-system and target file-system respectively) using the prior art tear-down method and notifies the user of the results. The source and target databases are created or updated by copying the contents of existing operating system file entries to the source and target databases respectively.

The synchronization framework ends at step 480 after the tear-down process has been completed at the tear-down step 470.

FIG. 5 is a block diagram illustrating a computer system setup of the preferred embodiment of the present invention. Referring to FIG. 5, a source computer 500 and a target computer 510 are electronically linked together with each computer having a file-system and a database of file entries in the file-systems.

The file-system in the source computer 500 is similarly configured as the file-system in the target computer 510. The two file-systems may have the same physical or logical size and contain the same file entries. The source file-system and the target file-system are synchronized with respect to each other across the electronic link by copying files from one computer to the other.

The database in each computer contains file entries that correspond to files in the respective file-systems (e.g., the source database contains file entries corresponding to the source file-system). The database in each computer is copied from each computer's file system entries at the completion of file synchronization. As files are synchronized, as described in FIG. 4, in each respective fie-system, the database in each computer is updated accordingly to reflect the current file entries in the file-system.

As files are deleted from the fie-systems, the operating system of each computer designates the deleted files with a specific notation over the first character of the deleted file e.g., [E5]OY.

The method of the present invention is activated when the user links the source computer 500 and the target computer 510 and runs software containing the file deletion method of the present invention.

FIG. 6 is a flow chart of the delete-check method of the preferred embodiment of the present invention. The delete-check method of the present invention is performed using operating system dependent characteristics to identify files deleted from the source file-system.

Referring to FIG. 6, the delete-check method begins when two computers with similarly configured file-systems are electronically linked together and the delete synchronization method of the present invention is activated by the computer user. In one embodiment of the present invention, the delete-check method is activated in the form of running a synchronize delete software program on both computers.

At processing block 600, the source computer's operating system directories are examined to identify files that have been deleted from the source file-systems. For example, in the DOS operating system, deleted files in the source file-system are characterized by an E5H notation ([E5]) replacing the first character in the file name in the operating system's directory. If a file is identified as deleted, processing continues at processing block 610; otherwise, processing continues at processing block 660.

At processing block 610, files identified as deleted in the source file-system are compared with file entries in the source file-system's synchronized database, which has the entries of all files that existed in the source file-system at a time prior to any file deletions from the source file-system, for corresponding file entries of the files identified in processing block 600. In the event the source database does not exist, the exit from processing block 610 is a "NO". If any such corresponding files entries are identified in the source database, the file entry is propagated to the target computer for comparison in the target file-system at processing block 620; otherwise, processing continues at processing block 660.

At processing block 620, deleted file entries propagated from the source file-system are compared with files entries in the target file-system to determine if the files match. It is not possible for the match at processing block 620 to be exact, since the deleted file entries in the source computer have the first character of the file names over-written with the [E5] notation. Thus, any first character in the target file-system may match the [E5] notation.

In order to reduce erroneous matches, the preferred embodiment requires that secondary file characteristics such as file date of creation, file size etc., also match. If a propagated file entry name thus matches a file entry in the target file-system, processing continues at processing block 630; otherwise, processing continues at processing block 660.

At processing block 630, a delete policy of the file delete method of the present invention is performed. The delete policy is a verification procedure to handle any file name ambiguities that may occur during the comparison of file entries in processing block 620. The delete policy gives the user the option of verifying file deletions in the target file-system. The delete policy comprises a "DON'T ASK" and an "ASK" setting. The "DON'T ASK" setting disables any queries to the user to verify files identified to be deleted from the target file-system. Thus, if the delete policy is "DON'T ASK", the delete-check method automatically deletes files from the target file-system based on file entries propagated from the source file-system. However, if the delete policy is "ASK", the computer user must verify files identified to be deleted from the target file system. Thus, if the delete policy is "ASK", the delete-check method queries the computer user for confirmation at processing block 640; otherwise, processing continues at processing block 650.

At processing block 640, the user is queried to verify whether a file identified as deleted in the source file-system, which has a corresponding entry in the target file-system, should be deleted from the target file-system. If the user confirms the verification query, processing continues at processing block 650; otherwise, processing continues at processing block 660.

At processing block 650, files identified as deleted in the source file-system and having corresponding entries in the target file-system are deleted from the target file-system. The delete-check method then proceeds to processing block 660 where other file entries are examined in the source file-system.

At processing block 660, other file entries are examined in the source file system and at processing block 670 the delete-check method determines if there are any more entries to be examined. If there are no more file entries to be examined in the source file-system, the delete-check method ends at processing block 680; otherwise, the delete-check method proceeds to processing block 600.

An example of how the delete-check method of the present invention operates is explained below. In the preferred embodiment of the present invention, the method includes two computers with similarly configured file-systems. Each of the two computers has a synchronized database of file entries present on each file-system at a time the two file-system were synchronized in relation to each other. For illustration purposes, the file-system where file deletion is originating is denoted as the source and the receiving file-system is denoted as the target file-system. Note that the source and target denotation can be used interchangeably between the two file-systems (e.g., the target file-system becomes the source file-system when it originates file deletions).

| Source File-system: OS Dir Entries | Source Database Entries | Target File-system: Target File-System |
|---|---|---|
| [E5]AN, date, 5235 | MAN, date, 5235 | MAN, date, 5235 |
| JAG | JAG | JOY, date, 3000 |
| [E5]OY, date, 3000 | BOY, date, 3000 | BOY, date, 3000 |
| [E5]UD, date, 512 | MIX, date, 2000 | KUD, date, 512 |

Assuming the above entries are the respective entries in the source computer's operating system directory, the source synchronized database, and the target file-system where the files identified as deleted from the source file-system have the [E5] notation in the first character of the file names in the source operating system directory. (e.g., [E5]OY). A file such as [E5]OY, which is identified as deleted has other information with the file entry. For example file entry [E5]OY is a file that existed in the source file-system that was created on a certain date and has a file length of 3000 bytes.

When the operation of the delete-check method begins at processing block 600, the operating system directory is scanned to identify deleted files. The scan will identify the following files as deleted: [E5]AN, [E5]OY, and [E5]UD.

After the files have been identified at processing block 600, the delete-check method performs processing block 610 which performs a source database comparison in the source computer. The identified deleted entries [E5]AN, [E5]OY, and [E5]UD are compared with file entries in the source database at processing block 610 in FIG. 6. The comparison in processing block 610 will confirm the following file entries in the source file-system: [E5]AN and [E5]OY as matching the following file entries MAN and BOY in the source database.

The result of the comparison for each of these file entries is as follows:

| File Entries: | Result of block 610 Decision: |
|---|---|
| [E5]AN | Yes |
| [E5]OY | Yes |
| [95]UD | No |

Thus, for entries [E5]AN and [E5]OY, processing continues at processing block 660. This thread of execution continues to processing block 670 and finishes at processing block 680. Note that if the file entry BOY were not in the source database, there would be an unavoidable ambiguity in which file to delete in the target file-system: JOY or BOY. For this reason, the preferred setting for the delete policy at processing block 630 is to be "ASK".

In practice, the possibility of an unavoidable ambiguity is low because the date/time/file size secondary characteristics serve to considerably reduce confusion. There is, however, the possiblity that a file could be mistakenly be deleted in the target computer. It requires a contrived example, as above, to illustrate this.

Upon completing the file entry comparisons at processing block 610, the file entry [E5]UD is propagated to the target computer and the delete-check method proceeds to processing block 620.

A comparison of the propagated file[s] from the source computer with the file entries in the target file-system will indeed confirm that the deleted file[s] in the source computer have corresponding entries in the target file-system. Thus, after the comparison at processing block 620, the delete policy is performed at processing block 630 to determine whether to query the user to confirm file deletions from the target file-system or not. If the delete policy is "DON'T ASK" or is "ASK" and the user confirms delete, the target file will be deleted at processing block 650; otherwise, deletion is by-passed by proceeding to processing block 660 if the user does not confirm delete at processing block 640.

The delete-check method proceeds to processing block 600 if there are any more entries to be identified in the source file-system. Note that the delete file entries from the source file-system may be propagated to the target computer one at a time or a list of identified deleted file entries may also be propagated. The method of propagation depends on the amount of disk space in the target computer among other considerations. If the target computer has less disk space, files may be propagated from the source computer to the target computer as the files are identified. If the target computer has enough disk space, a list of files are propagated from the source computer to the target computer.

FIG. 7 is a flow chart illustrating the basic file deletion method of the present invention. The basic file deletion method is another embodiment of the present invention, the basic file deletion method uses operating system independent file identification methods to identify deleted files in the source file-system. Thus, the basic file deletion method requires the existence of copies of a synchronized file database in the source and target file-systems respectively. The entries in each of these databases are the files that existed in each respective file-system the last time each file-system was synchronized with respect to the other.

Still referring to FIG. 7, the function of the basic file deletion method begins at processing block 700, with the comparison of file entries in the source database with file entries in the source file-system to identify file entries in the source database that have been deleted from the source file-system. The file identification process of this method depends on the comparison between the entire name of a file in the source file-system with a corresponding file name in the source database. In this manner, any file name ambiguities are avoided. After files deleted from the source file-system have been identified in the source database, the files entries are propagated to the target computer for comparison with the target file-system file entries at processing block 710; otherwise, processing continues at processing block 750 where another file entry in the source database is examined.

At processing block 710, files propagated from the source computer are compared with file entries in the target file system. If any of the propagated files match entries in the target file-system, the files are deleted from the target file-system at processing block 740 if the delete policy at processing block 720 is "DON'T ASK". On the other hand, if a file propagated from the source computer does not match a file entry in the target file-system, processing continues at processing block 750.

At processing block 720, the basic delete method performs the delete policy which if set to "DON'T ASK" results in automatic file deletions from the target file-system without any user verification of files to be deleted from the target file-system. If the delete policy is "ASK", the user is queried at processing block 730 to confirm file deletions from the target file-system. The basic delete method then proceeds to processing block 730.

At processing block 730, if the user confirms that a file should be deleted from the target file-system, the file is deleted at processing block 740; otherwise, processing continues at processing block 750 where another file entry is examined in the source computer.

At processing block 740, files identified as deleted from the source file-system with corresponding entries in the target file-system are deleted either after the computer user has confirmed such file deletion or when the delete policy has been set to "DON'T ASK" and an automatic deletion occurs in the target computer. The basic delete method then proceeds to processing block 750.

At processing block 750, other file entries in the source file-system and the source database are examined to determine whether to proceed with the basic delete method at processing block 700 or not. At processing block 770, if there no more file entries to be considered, the basic delete method ends at processing block 780; otherwise, processing continues at processing block 700.

Note that deleted file entries in the source computer are identified by comparing the entire file name of file entries in the source database with file entries in the source file-system. Therefore, there isn't any ambiguity in identifying files as may be experienced during the delete-check phase illustrated in FIG. 6 above. Thus, the basic delete phase may be performed without querying the user (i.e., delete policy set to "DON'T ASK") to verify files before deletions from the target file-system. Despite the identical wording and appearance for processing blocks 720 and 630 in FIG. 6, in the preferred embodiment, these are distinctly separate tests. The default policy for processing block 630 is "ASK" and for processing block 720 is "DON'T ASK".

Multiple Computer Considerations

In an alternate embodiment, the present invention may be utilized in a multiple computer setting which requires additional synchronization be done in a general N-way case. Assuming 6 computers in a ring arrangement with 1 tied to 2 tied 3, etc., and 6 tied back to 1. If a synchronization session is held between 1-2- 3-4 and 5-6, with 3 shown in boldface and underlined to indicate it is the most recent file, the progress of synchronization by round robin is as follows with the numbers boldfaced and underlined indicating the computers being synchronized:

1-2, 3-4, 5-6 ends round 1
1-2, 3-4, 5-6 ends round 2
1-2, 3-4, 5-6 ends round 3 Int[(N+1)/2] sync rounds are required for a ring and {Int[log2(N −1)]−1} is the best case for a topology with computers synchronizing in pairs shown in the illustration above.

In an environment where only two computers are to be synchronized to each other, it is possible to simplify this so that only a single copy of the database is kept on one of the computers.

Although the present invention has been described herein with reference to a specific preferred embodiment, many modifications and variations therein will readily occur to those skilled in the art. Accordingly, all such variations and modifications are included within the intended scope of the present invention as defined by the following claims.

Thus a method and apparatus for synchronizing file deletions across similarly configured file-systems in multiple computer systems is described.

I claim:

1. A method for synchronizing file deletions across similarly configured file-systems in computer systems electronically linked together, wherein said file deletions originate from a source computer to a target computer, said method comprising the steps of:
   (a) scanning the operating system directory of said source computer system to identify files deleted in a source file-system upon said file deletion being initiated in said source computer, wherein a first list of entries of said deleted file is generated from said identified files in said source file-system;
   (b) propagating said first list from said source file-system on said source computer to said target file-systems on said target computer, wherein said target file-system upon receiving said first list compares file entries in said target file-systems with file entries in said propagated first list; and
   (c) deleting files identified in said propagated first list having corresponding entries in said target file-system from said target file-system.

2. The method of claim 1 wherein step (c) further includes a delete policy wherein file deletions in said target file-system are subject to an optional user verification with respect to file entries in said target file-system before said files are deleted from said target file-system.

3. The method of claim 1 wherein step (a) includes using said computer system's operating system file identification characteristics to identify files deleted from said source file-system.

4. A method for synchronizing file deletions across similarly configured file-systems in a plurality of computer systems electronically linked together, wherein said file deletions originate from a source computer to a target computer which receives said file deletions, said method comprising the steps of:
   (a) creating a synchronized database of file entries existing in said source and said target file-systems respectively prior to said file deletions in said source file-system;
   (b) scanning said source file-system upon an initialization of said file deletion to identify files deleted in said source file-system, wherein a list of file entries of said deleted files is generated, wherein said identification step is reciprocated in said target file system;
   (c) propagating said identified deleted files list from said source file-system to said target file-system, wherein said propagation step is reciprocated in said target file-system;
   (d) comparing file entries in said propagated deleted files list with file entries in said target file-system, such that corresponding file entries in said target file-system and said propagated files list are identified; and
   (e) deleting said corresponding file entries in said propagated deleted files list and in said target file-system from said target file-system.

5. The method of claim 4 wherein said step (d) is performed in said source file-system.

6. The method of claim 4 wherein said step (f) is performed in said source file-system.

7. The method of claim 4 wherein said step (b) includes a step of comparing files presently existing in said source file-system with file entries in said synchronized source database, such that said deleted files list is generated in said source file-system upon detecting file entry differences between said synchronized source database and said files presently existing in said source file-system.

8. The method of claim 4 wherein said step (b) further includes comparing file characteristics of said deleted files in said source file-system with file entries in said synchronized source database, such that only files existing in said source synchronized database and absent in said source file-system are identified as deleted.

9. The method of claim 4 wherein said step (e) includes the step of comparing files presently existing in said target file-system with said propagated deleted files list from said source file-system to determine whether file entries in said deleted files list have corresponding entries in said target file-system, wherein said identified corresponding file entries in said target file-system are deleted from said target file-system.

10. The method of claim 4 further including the step of automatically checking file-system space in said target file-system immediately prior to the copying each of said propagated deleted files from said source file-system.

11. An apparatus for synchronizing file deletion across similarly configured file-systems in a plurality of computer systems, wherein said computer systems are electronically linked, said apparatus comprising:
   an activating means for activating said file deletions in said computer systems;
   an identifying means for identifying files deleted in said source file-system, wherein a list of said deleted files is created; and
   a propagating means for propagating said deleted files list from said source file-system to a target file-system, wherein said deleted files list is deleted from said target file-system.

12. The apparatus of claim 11 wherein said identification means in said source file-system includes an operating system dependent means in said computer system for identifying files deleted in said source file-system.

13. The apparatus of claim 11 wherein said file deletion means in said target file-system includes a delete policy means for confirming files identified to be deleted from said target file-system.

14. An apparatus for synchronizing file deletion across similarly configured file-systems in a plurality of computer systems, wherein said computer systems are electronically linked such that said file deletion originates from a source computer and said file deletion is received in a target computer, said apparatus comprising:
   a database creating means for creating a synchronized database of file entries existing in said file-systems prior to initiating file deletions from said source computer; an identifying means for identifying files deleted from a source file-system, wherein a list of deleted file entries is generated;
   a propagating means for propagating said list of deleted file entries from said source file-system to a target file-system, wherein said list of deleted file entries is compared with existing file entries in said target file-system such that corresponding file entries in said target file-system are identified; and
   a file deleting means for deleting said identified corresponding file entries from said target file-system.

15. The apparatus of claim 14 wherein said identification means of files deleted in said source file-system comprises a comparing means for comparing files currently existing in said source file-system with files entries in said synchronized database in said source computer, such that files present in said synchronized database but absent in said source file-system are identified as deleted.

16. The apparatus of claim 14 wherein said propagation of said list of deleted files from said source file-system is subject to a delete policy means in said target file-system, such that files identified in said propagated list are verified with respect to files presently existing in said target file-system before being deleted.

17. In a computer system having similarly configured file-systems, an apparatus for synchronizing file deletion across said similarly configured file-systems, said apparatus comprising:

- a database creating means for creating a synchronized database in said source file-system;
- an identifying means for identifying files deleted from said source file-system, wherein a list deleted file entries is generated;
- a propagating means for propagating said deleted file entries list from said source file-system to said target file-system, wherein said list is subsequently compared with file entries in said target file-system; and
- a file deleting means for deleting files entries in said propagated list with corresponding file entries in said target file-system is deleted.

18. The apparatus of claim 17 wherein said identifying means of identifying files deleted in said source file-system comprises a means for comparing files currently existing in said source file-system with files entries in said synchronized database in said source file-system, such that said files present in said synchronized database but absent in said source file-system are identified as deleted.

19. The apparatus of claim 17 wherein said propagation of said first list from said source file-system is subject to a delete policy upon receipt in said target file-system such that files identified in said first list are verified with respect to files presently existing in said target file-system before being deleted.

* * * * *

UNITED STATES PATENT AND TRADEMARK OFFICE
CERTIFICATE OF CORRECTION

PATENT NO. : 5,680,609
DATED : October 21, 1997
INVENTOR(S) : Dennis Reinhardt

It is certified that error appears in the above-identified patent and that said Letters Patent is hereby corrected as shown below:

In column 5 at line 4 delete "fie" and insert --file--

In column 5 at line 7 delete "fie" and insert --file--

In column 5 at line 8 delete "fie" and insert --file--

In column 5 at line 13 delete "fie" and insert --file--

In column 5 at line 17 delete "fie" and insert --file--

In column 5 at line 18 delete "fie" and insert --file--

In column 6 at line 33 delete "fie" and insert --file--

In column 6 at line 36 delete "fie" and insert --file--

Signed and Sealed this

Tenth Day of February, 1998

*Attest:*

BRUCE LEHMAN

*Attesting Officer*     *Commissioner of Patents and Trademarks*